INVENTOR
JOHN P. GLASS
ATTORNEYS

Sept. 16, 1969    J. P. GLASS    3,467,081
INFLATABLE MASSAGING MATTRESS
Filed May 4, 1966    6 Sheets-Sheet 2

INVENTOR
JOHN P. GLASS
BY
*Busser Smith & Harding*
ATTORNEYS

Sept. 16, 1969  J. P. GLASS  3,467,081
INFLATABLE MASSAGING MATTRESS

Filed May 4, 1966  6 Sheets-Sheet 3

INVENTOR
JOHN P. GLASS
BY
*Busser Smith & Harding*
ATTORNEYS

INVENTOR
JOHN P. GLASS

United States Patent Office 3,467,081
Patented Sept. 16, 1969

3,467,081
INFLATABLE MASSAGING MATTRESS
John P. Glass, Ardmore, Pa. (% Cava Industries, 79 La Grange Ave., Essington, Pa. 19029)
Continuation-in-part of application Ser. No. 508,701, Nov. 19, 1965. This application May 4, 1966, Ser. No. 554,256
Int. Cl. A61h 1/00
U.S. Cl. 128—33           9 Claims This invention relates to a mattress and more particularly concerns a mattress which is adapted to provide ventilation and a gentle massaging action to a person lying on the mattress. This patent application is a continuation-in-part of my co-pending patent application Ser. No. 508,701, filed Nov. 19, 1965 and now abandoned.

It is customary in hospitals to place rubber sheets on hospital beds under patients. Such beds are hot to lie on because the rubber sheet cuts off ventilation beneath the patient.

Another problem encountered in hospital beds is that the patient lying on the bed does not get a sufficient amount of exercise and this disadvantageously affects his blood circulation and promotes the acquiring of bedsores.

Accordingly, it is an object of this invention to provide a mattress which overcomes the aforementioned problems of the prior art.

It is another object to provide a mattress which provides for the circulation of air beneath a person lying on the mattress and thereby provides ventilation.

It is another object to provide a mattress that gently massages the person, which helps him relax, improves his blood circulation, and helps prevent bedsores.

It is another object to provide a mattress which massages the person lying on it, such as a baby in a crib, in the direction toward the middle of the mattress and thus helps prevent the baby from falling out of the crib.

It is another object to provide a mattress which is adapted to massage a person lying on it at a number of different rhythms. For example, the mattress may gently thump at the rate of a mother's heart-beat and also at the rate of a mother's breathing, in order to soothe a baby.

Other objects and advantages of this invention, including its simplicity and economy, will further become apparent hereinafter and in the drawings, in which.

Figure 1:
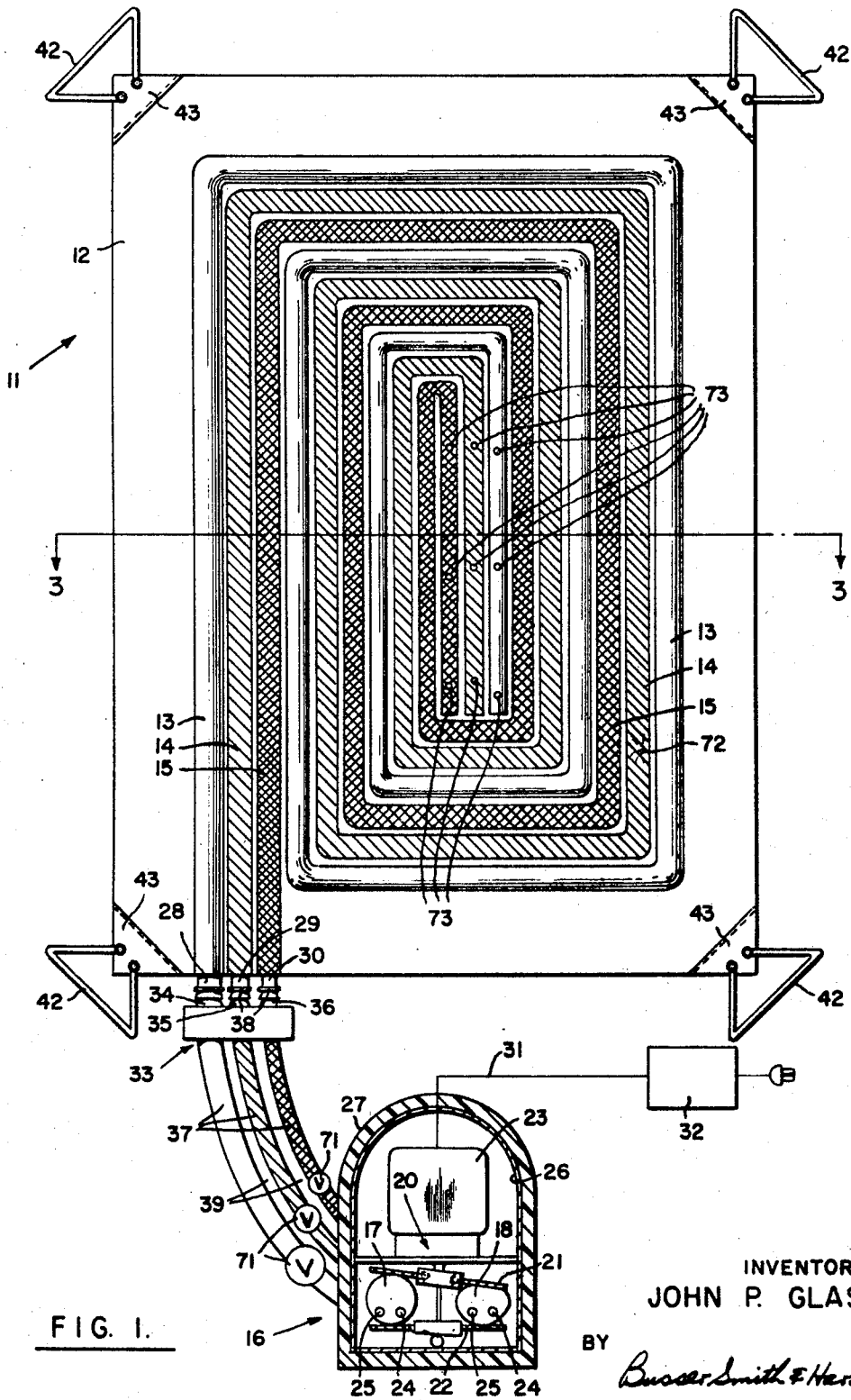
FIG. 1 is a view in top plan of a mattress constructed in accordance with this invention and is a view in vertical section of the means for actuating the mattress.
Figure 2:
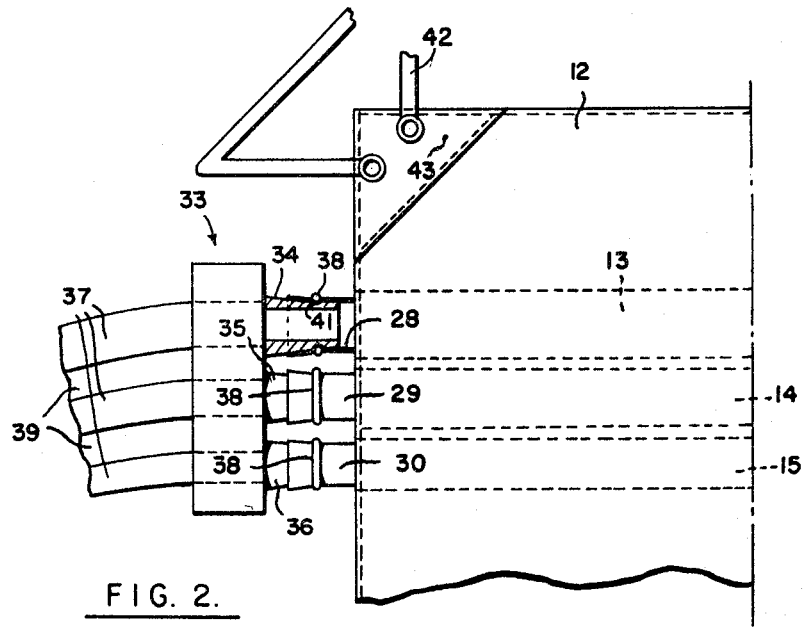
FIG. 2 is an enlarged partial view in top plan and partly in section and illustrates the connecting means to the mattress.
Figure 3:
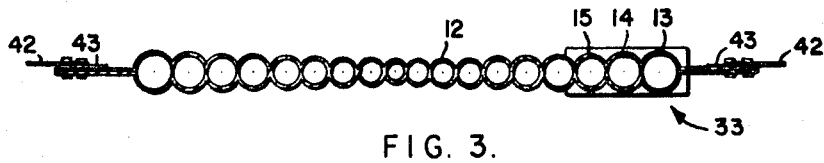
FIG. 3 is a view in section taken as indicated by the lines and arrows 3—3 which appear in FIG. 1.

Although specific terms are used in the following description for clarity, these terms are intended to refer only to the structure shown in the drawings and are not intended to define or limit the scope of the invention.

Turning now to the specific embodiments of the invention selected for illustration in the drawings, there is shown a mattress 11 which comprises a double-sheet 12 of material, preferably polyethylene, that contains systems 13–15 of hollow channels which are filled with a gas, such as air. Means are connected to the channel systems 13–15 for varying the pressure of the gas therein to inflate and deflate the channels in alternate fashion, and such means includes a pump 16 having a pair of gas filled bladders 17, 18. A wobble plate 21 is adapted to contact the top of bladders 17 and 18 to expand and contract the bladders. Another wobble plate 22 is mounted beneath bladders 17 and 18 and is adapted to expand and contract the bladders by contacting the bottom of the bladders. A motor 23 is connected to wobble plates 21 and 22 through gear means 20 and is arranged to wobble one or both of plates 21 and 22 and to do so at a number of different rhythms.

A gas intake valve 24 is provided in each bladder 17, 18 for admitting gas to the bladder if the pressure gets too low, and a gas vent 25 is provided for emitting gas from bladders 17, 18 if the pressure therein should get too high.

A housing 26 encloses pump 16 and motor 23, and a foam cover 27 encloses housing 26 to reduce noise. Electrical conductors 31 extend from motor 23 to electrical controls 32 which may be plugged into an electrical outlet. Motor 23 may be a variable speed motor so as to allow adjustment of the pulse frequency to suit the individual lying on the mattress.

Tubular nipples 28–30 extend from the ends of channel systems 13–15. A manifold 33 having stubs 34–36 is provided for making connection to nipples 28–30. Plastic tubes 37, joined together by webs 39, connect manifold 33 to pump 16.

To insure that manifold 33 is connected to nipples 28–30 in the proper manner, the nipples are made of different sizes, with nipple 28 having the largest diameter and nipple 30 having the smallest. Stubs 34–36 of manifold 33 are made to match the sizes of nipples 28–30 and they cannot be inserted into the nipples unless the sizes match.

A quick, easy and inexpensive connection and disconnection is made between manifold 33 and nipples 28–30 by providing an O-ring or resilient band 38 that clamps the outside of the nipple against a groove 41 formed in the manifold stubs 34–36. A jam ring may be used to form the connection between the nipples and the manifold stubs, but the resilient O-ring is preferred because a jam ring may damage the nipples which may be made of a plastic material such as polyethylene.

Channel systems 13–15 are independent of each other and are arranged side by side and follow a path which is substantially rectangular as shown in FIG. 1. The cross-sectional diameter of the channel systems decreases progressively, with the smaller channels being near the center of the mattress and the larger channels being nearer the sides.

The gas pressure in the channels is varied in sequence from the ouside toward the middle of the mattress so as to tend to walk a person lying on the mattress toward its middle. This is a highly advantageous feature especially when the mattress is being used in a crib, and helps prevent a bady lying on the mattress from falling out of the crib since it tends to move the baby toward the center of the mattress.

Corner tapes 42, which may be made of a resilient material, are provided at each corner of mattress 11 and are adapted to be flipped over the corners of a conventional mattress positioned beneath it so as to position the mattress 11 on the bed Reinforcing gussets 43 are provided at each corner of mattress 11 to support the stretchable tapes 42.

Figure 4:
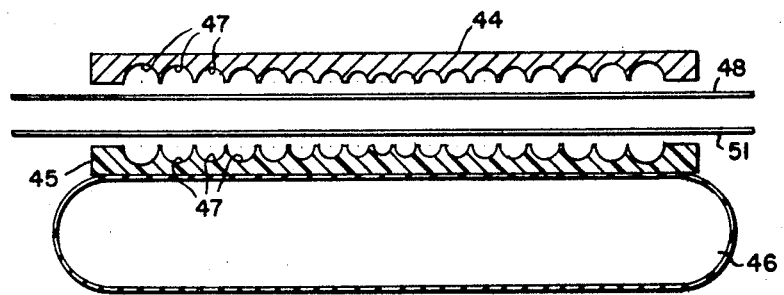
FIG. 4 is a view in section of means adapted for making the mattress.
Figure 5:
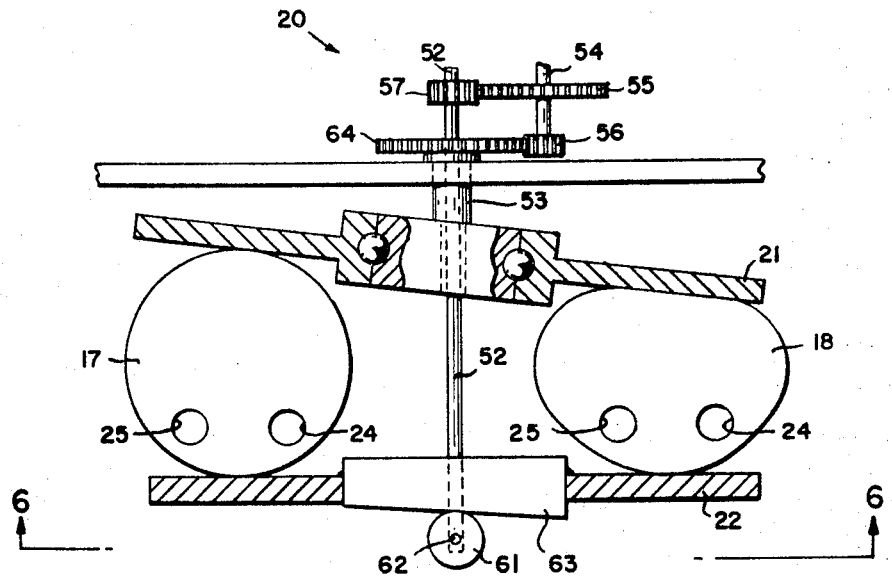
FIG. 5 is an enlarged view in vertical section of the means for actuating the mattress.
Figure 6:
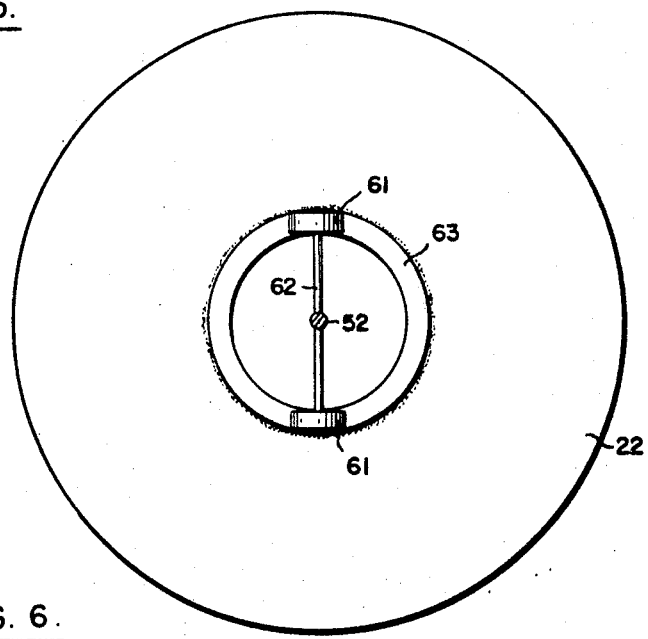
FIG. 6 is a view taken as indicated by the lines and arrows 6—6 which appear in FIG. 5.

FIG. 4 illustrates apparatus which is adapted for manufacturing mattress 11. A heated aluminum top die 44 is positioned above a Bakelite or other plastic bottom die 45. A bladder 46 is positioned below bottom die 45. Top die 44 and bottom die 45 have grooves 47 formed therein. A pair of sheets 48 and 51 of polyethylene, or other suitable plastic material, is passed between dies 44 and 45 in spaced-apart relation. Then the sheets 48 and 51 are stopped, and bladder 46 is inflated to push bottom die 45 against top die 44 to form a combined or doublesheet 12 of mattress 11 having channel systems 13–15 formed therein. Sheets 48 and 51 are heat sealed together while being pressed together by the apparatus of FIG. 4.

To operate the wobble plates 21 and 22 at different speeds, gear means 20 may include a pair of concentric shafts 52, 53 which are rotated at different speeds and which connect the wobble plates 21, 22 to the motor 23.

Motor gear-shaft 54 drives a larger gear 55 and a smaller gear 56, and gear 55 drives a gear 57 on inner faster shaft 52.

A pair of rollers 61 are mounted on an arm 62 which extends from the bottom of shaft 52. The bottom of wobble plate 22 has a cam surface 63, and the rollers 61 run on this cam surface. Accordingly, rotation of rollers 61 on cam surface 63 causes plate 22 to wobble up and down to inflate and deflate bladders 17, 18.

Motor shaft gear 56 drives a larger gear 64 on outer slower shaft 53 that is connected to wobble plate 22 which is canted from the horizontal so that rotation of plate 21 causes it to wobble up and down to inflate and deflate bladders 17 and 18 in accordance with a rhythm dictated by the rotational speed of shaft 53.

Additional means for maintaining the desired pressure in lines or channel systems 13–15 may be provided by stop valves 71 mounted in plastic tubes 37. If a small leak 72 develops in the channel system of mattress 11, such as in channel 14, valves 71 are adapted to draw air into the channel system.

If it is desired to further ventilate the patient, a series of holes 73 may be provided in the channels in the center of mattress 11, and air may be pumped through those holes by pump 16. If the air is warm, as it would be if taken from motor housing 26 through intake valves 24, it warms the patient lying on the bed as well as providing ventilation.

In operation, channel systems 13–15 are inflated in sequence, thereby raising the channels in the mattress sequentially.

With the double wobble plates 21 and 22, a number of motions may be introduced into the channel systems. A slow motion may be introduced for massage purposes, and a rapid motion, 20 cycles per second for example, may be introduced to vibrate the mattress for older people who have circulatory problems. Additionally, the motions of the channels may be varied to simulate the heart-beat of a mother to pacify a baby in a crib, and/or the motion may simulate the mother's breathing. The motion of the channel systems applies a rhymthic thump to the baby's whole body.

Figure 7:
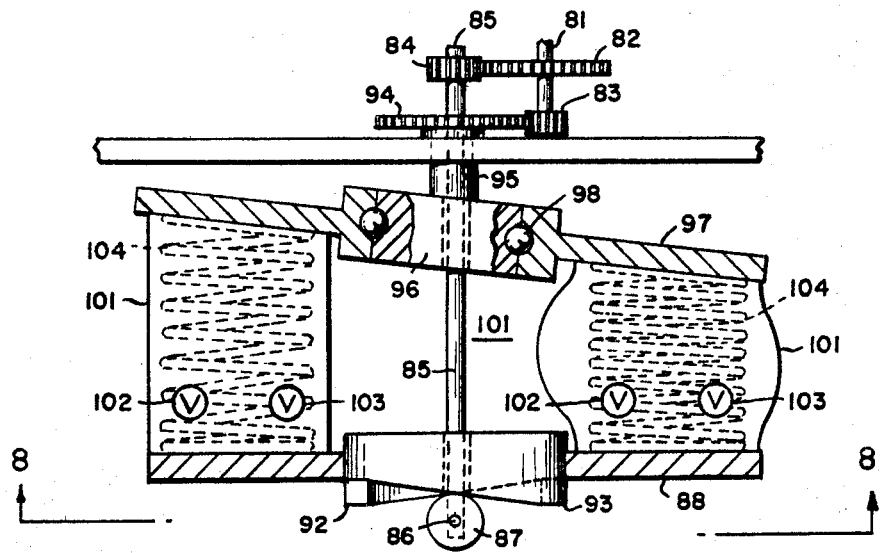
FIG. 7 is an enlarged view in vertical section of another embodiment of means for actuating the mattress.
Figure 8:
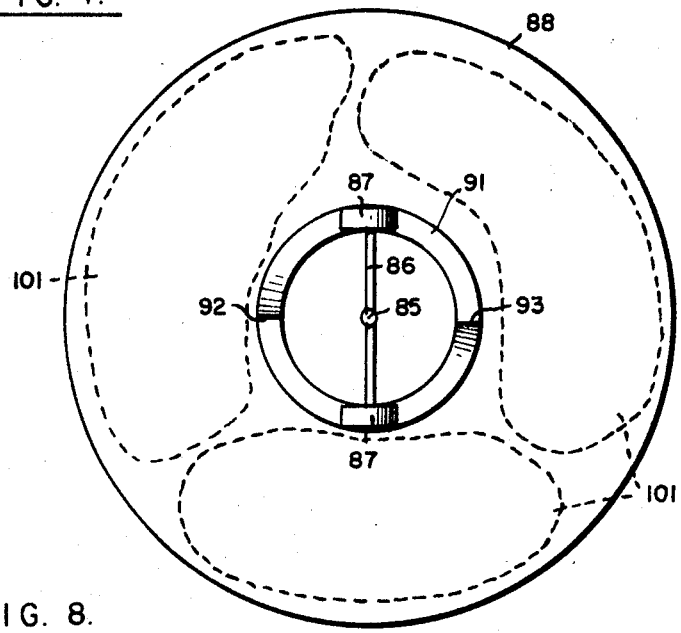
FIG. 8 is a view taken as indicated by the lines and arrows 8—8 which appear in FIG. 7.

Turning now to FIGS. 7 and 8, there is shown another form of means for varying the pressure of the gas within mattress 11 to alternately or successively inflate and deflate the channels or subdivisions of the mattress. A shaft 81, from motor 23, rotates a pair of gears 82 and 83 mounted thereon. Gear 82 meshes with a smaller gear 84 which is mounted on a shaft 85. At the bottom of shaft of 85, an arm 86 is provided which extends transversely to the shaft and supports at its ends a pair of rollers 87.

A plate 88 is adapted to slide up and down on the lower end of shaft 85. Plate 88 is provided with a cam track 91 that has downwardly extending peaks 92 and 93. As rollers 87 are rotated along cam track 91 by shaft 85, the cam track 91 causes plate 88 to rise and fall on shaft 85. This imparts a recurring thump to the pump and mattress which may be so timed as to simulate the rhythmic thumping of a heart beat.

The advantages of the invention are numerous. It helps to ventilate the skin of a person lying on the mattress. It also helps to center the person in the bed or crib, and gives a comforting relaxing massage which may be semihypnotic and thus induce sleep.

A two channel system mattress provides alternating pressure, and a mattress having three or more channel systems provides sequential pressures and a resulting wave motion.

Gear 83 of motor shaft 81 meshes with a gear 94 that is mounted on a cylindrical shaft 95 which is coaxial with shaft 85. A plate 96 is mounted on the bottom of shaft 95 in canted fashion and rotates with shaft 95. Another plate 97 is connected to plate 96 by ball bearings 98 so that rotation of shaft 95 and plate 96 causes plate 97 to wobble up and down. Plate 97 is restrained from rotation, such as by bosses extending from the sides of plate 97 into vertical recesses.

Positioned between plates 88 and 97 are three bladders or reservoirs 101 which are adapted to contain air or other gas. A gas intake valve 102 is provided in each bladder 101 for admitting gas to the bladder if the pressure gets too low, and a gas vent 103 is provided for emitting gas from the bladder if the pressure therein should become too high.

In operation of the apparatus of FIGS. 7 and 8, the rotation of shaft 85 and rollers 87 causes the plate 88 to rise and fall to deflate and inflate bladders 101 in a rhythmically thumping fashion. The rotation of cylindrical shaft 95 causes the plate 97 to wobble and impart a rhythmic pressure variation to bladders 101 by causing them to deflate and inflate in accordance with the position of plate 97. Bladders 101 are connected to plastic tubes 37 which are in turn connected to channels 13–15.

To insure that bladders 101 inflate when plates 88 and 97 move apart, they may be physically connected to plates 88 and 97 so that the plates pull the opposite sides of the bladders apart. Alternatively, return springs 104 may be positioned inside each bladder to cause bladders 104 to expand when plates 88 and 97 move apart.

Figure 9:
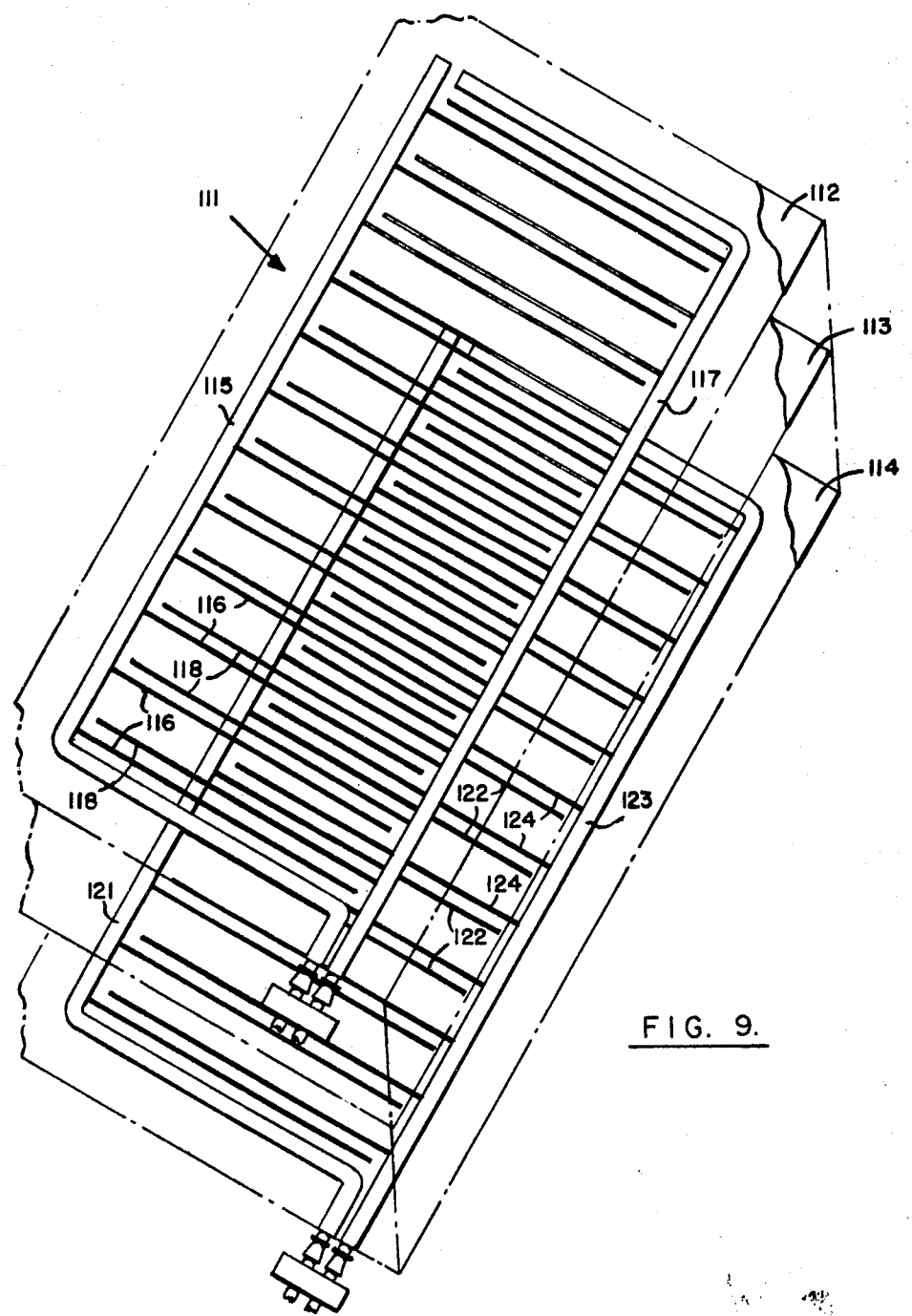
FIG. 9 is an exploded schematic view of another embodiment of the invention.

FIG. 9 illustrates schematically a triple-sheet embodiment of the invention which comprises three sheets 112–114 that are positioned in sandwich fashion so as to form a double mattress 111 having two layers. FIG. 9 illustrates the double mattress 111 in exploded view so that the overlapping elements may be shown more clearly. The top layer includes an L-shaped feed manifold 115 having fingers 116 extending across the mattress. An inverted L-shaped feed manifold 117 is also provided which has fingers 118 extending across the mattress toward the upright leg of feed manifold 115. Cross fingers 118 and 116 are in alternate relationship so that feed manifold 115 may inflate cross fingers 116 while feed manifold 117 deflates cross fingers 118, and vice versa. Accordingly, the body of a person lying on the mattress is alternately supported by cross fingers 116 and 118 so that no particular point on the body is continuously subjected to support pressure. Instead, any particular point is alternately subjected to support pressure from a cross finger, and then relieved of that pressure when that cross finger is deflated and the adjacent cross finger is inflated.

The lower layer of the double mattress 111 includes a feed manifold 121 having fingers 122 extending across the mattress, and a feed manifold 123 having cross fingers 124 alternately positioned with the fingers 122. Cross fingers 116 and 118 of sheet 112 are alternately positioned with cross fingers 122 and 124 of sheet 114. Accordingly, the inflating of the cross fingers may be done in sequence so that the pressure point or area between the mattress and the body of the person lying thereon may vary in accordance with that sequence. For example, the sequence of inflating the fingers may be 116, 118, 122, 124, and then repeat, so that no particular point of a person's body is continuously subjected to support pressure.

Figure 10:
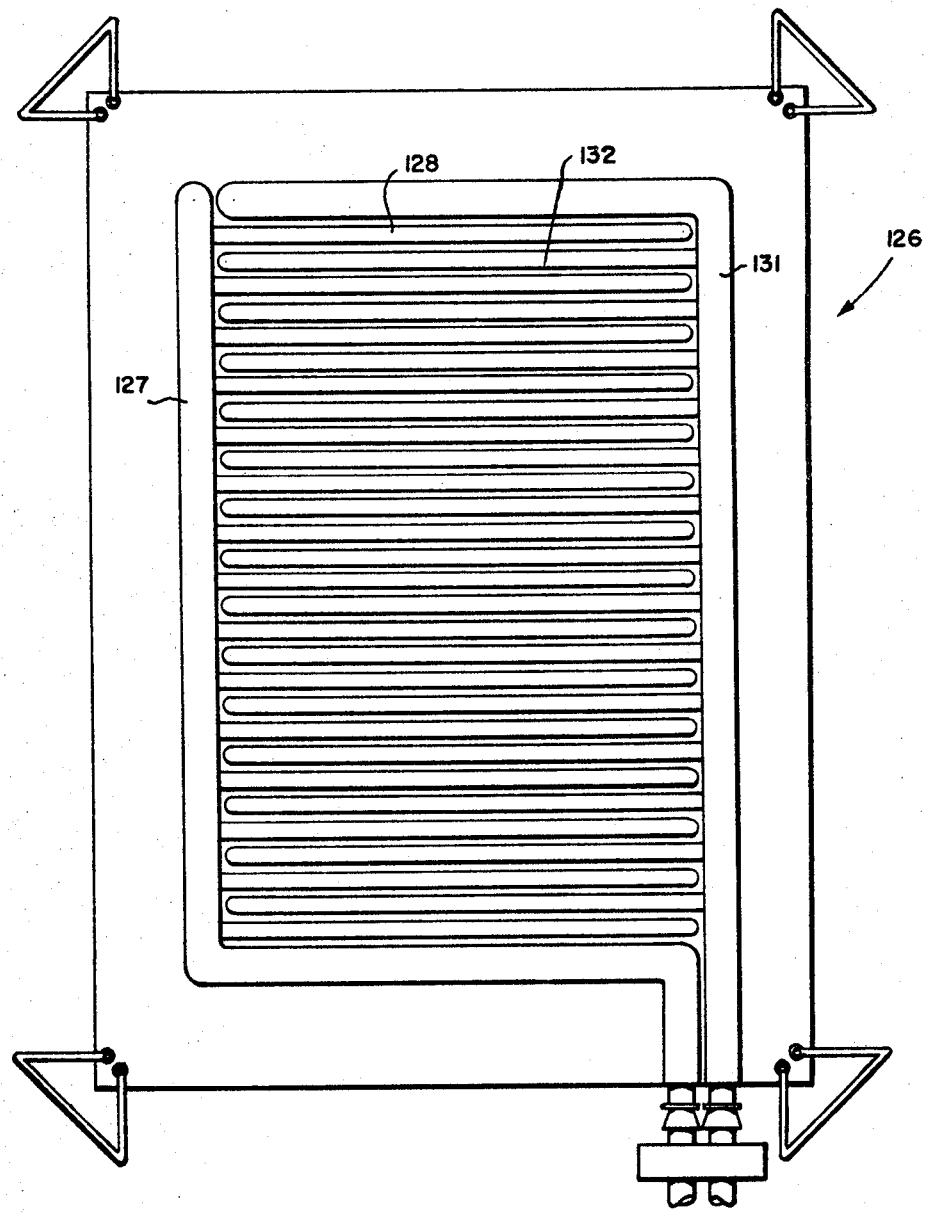
FIG. 10 is a view in top plan of another embodiment of the invention.

FIG. 10 illustrates another double-sheet embodiment of the invention and comprises an inflatable mattress 126 having at least two separately inflatable subdivisions. The subdivisions may take the form of a feed manifold 127 running lengthwise and having fingers 128 extending across the mattress, and a feed manifold 131 having cross fingers 132 alternately positioned with the cross fingers 128.

In operation, fingers 128 and 132 are alternately inflated and deflated so that fingers 128, when inflated, supply support pressure to a particular area of a person's body, and then that support pressure is withdrawn from that particular area when fingers 128 are deflated and fingers 132 are inflated to provide support to another area of the person's body. The timing of the inflating and deflating of fingers 128, 132 may be such that the person's body remains on the same level, and does not rise or fall. This may be accomplished for example, by inflating fingers 132 before deflating fingers 128, then inflating fingers 128 before deflating fingers 132, and so on in like manner.

In all embodiments of the invention, means are provided for alternately inflating and deflating the subdivisions of the mattress so that the blood of a person lying on the mattress is not prevented from circulating at the pressure points between the person's body and the mattress, except for short intervals. In other words, the pressure points between the body and the mattress are continuously being shifted by the sequential inflation and deflation of adjacent cross fingers, or channels, or other inflatable elements of the mattress.

It is to be understood that the form of the invention herewith shown and described is to be taken as a presently preferred embodiment. Various changes may be made in the shape, size and arrangement of parts. For example, equivalent elements may be substituted for those illustrated and described herein, parts may be reversed, and certain features of the invention may be utilized independently of the use of other features, all without departing from the spirit or scope of the invention as defined in the subjoined claims.

What is claimed is:

1. A mattress comprising a sheet of material having a system of hollow channels, said channels being filled with a gas, and means connected to the channels for varying the pressure of the gas therein to expand and contract the channels in alternate fashion, said means comprising a pump including a gas-filled bladder, a wobble plate contacting the bladder, and motor means for wobbling the wobble plate to expand and contract the bladder in alternate fashion.

2. The mattress according to claim 1 wherein the bladder is provided with an intake valve for admitting gas to the bladder if pressure gets too low.

3. The mattress according to claim 1 wherein the pump is driven by a motor, a housing encloses the pump and motor, and a foam cover encloses the housing to reduce noise.

4. A mattress comprising a sheet of material having a system of hollow channels, said channels being filled with a gas, and means connected to the channels for varying the pressure of the gas therein to expand and contract the channels in alternate fashion, said means comprising a pump including three gas-filled bladders, a plate supporting the bottom of the bladders and adapted to rise and fall, a wobble plate contacting the top of the bladders, means for causing the wobble plate to wobble up and down to expand and contract the bladders in sequence to pulse the bladders in rhythmic fashion, and thumping means for causing said bottom plate to rise and fall to expand and contract the bladders in a rhythmically thumping fashion.

5. A mattress comprising a sheet of material having a system of hollow channels, said channels being filled with a gas, and means connected to the channels for varying the pressure of the gas therein to expand and contract the channels in alternate fashion, said means including a pump and tubing having a manifold at the end for connecting the pump to the channels, said channels being of different sizes, and said manifold being provided with manifold stubs of such size as to match the channel sizes to insure that the channels are connected to the manifold in proper sequence.

6. A mattress comprising a sheet of material having a system of hollow channels, said channels being filled with a gas, and means connected to the channels for varying the pressure of the gas therein to expand and contract the channels in alternate fashion, said means including means for imparting a first rhythm to the channel system and for simultaneously superimposing a second rhythm to the channel system.

7. A mattress comprising a sheet of material having a plurality of systems of hollow channels, said channels being filled with a gas, and means connected to the channels for varying the pressure of the gas therein to expand and contract the channels in alternate fashion, each channel system being independent of the other system, said means connected to the channels for varying the pressure of the gas including means for rhythmically varying said pressure to expand and contract the channels in a rhythmic fashion, whereby to provide for circulation of air beneath a person lying on the mattress and to provide for a massaging action on that person to improve blood circulation and avoid bed sores, said systems being arranged side by side across the mattress with the size of the channels in cross section decreasing progressively and with the smaller channels being near the center of the mattress.

8. A mattress comprising a sheet of material having a plurality of systems of hollow channels, said channels being filled with a gas, and means connected to the channels for varying the pressure of the gas therein to expand and contract the channels in alternate fashion, each channel system being independent of the other systems, the means connected to the channel systems for varying the pressure of the gas gas including means for rhythmically varying said pressure to expand and contract the channels in a rhythmic fashion, whereby to provide for circulation of air beneath a person lying on the mattress and to provide for a massaging action on that person to improve blood circulation and avoid bed sores, said systems being arranged side by side across the mattress and the pressure in the channels being varied in sequence from the outside toward the middle of the mattress so as to tend to walk a person on the mattress toward said middle.

9. An inflatable mattress comprising at least two separately inflatable subdivisions, and means for alternately or sequentially inflating and deflating the subdivisions so that the blood of a person reclining on the mattress is not prevented from circulating at the pressure points between the person's body and the mattress, except for short intervals of time, said mattress including three sheets positioned in sandwich fashion so as to form a double mattress having top and bottom layers, said top layers having two lengthwise feed manifolds with fingers extending across the mattress from each feed manifold toward the other feed manifold in alternate fashion, said bottom layer having two lengthwise feed manifolds with fingers extending across the mattress from each feed manifold toward the other feed manifold in alternate fashion, and with the top layer fingers being alternately positioned with the bottom layer fingers, whereby the cross fingers may be inflated in sequence so that the pressure area between the mattress and the body of a person lying thereon may vary in accordance with that sequence.

References Cited

UNITED STATES PATENTS

| | | | |
|---|---|---|---|
| 2,437,006 | 3/1948 | Simpson | 128—33 |
| 2,719,986 | 10/1955 | Rand | 5—348 |
| 2,932,821 | 4/1960 | Horton | 128—33 XR |
| 2,998,817 | 9/1961 | Armstrong | 128—33 |
| 3,008,465 | 11/1961 | Gal | 128—33 |

L. W. TRAPP, Primary Examiner

U.S. Cl. X.R.

128—24.2, 40